United States Patent [19]

Jury

[11] Patent Number: 4,832,710
[45] Date of Patent: May 23, 1989

[54] DUST-COLLECTING APPARATUS

[75] Inventor: Egon Jury, Egelsbach, Fed. Rep. of Germany

[73] Assignee: Metallgesellschaft Aktiengesellschaft, Frankfurt am Main, Fed. Rep. of Germany

[21] Appl. No.: 194,416

[22] Filed: May 13, 1988

[30] Foreign Application Priority Data

May 14, 1987 [DE] Fed. Rep. of Germany ....... 3716126

[51] Int. Cl.⁴ ............................................ B01D 45/08
[52] U.S. Cl. ........................................ 55/1; 55/126; 55/189; 55/442; 55/446
[58] Field of Search ...................... 55/1, 52, 442–446, 55/440, 126, 55, 189

[56] References Cited

U.S. PATENT DOCUMENTS

| | | | |
|---|---|---|---|
| 867,742 | 10/1907 | Morison | 55/444 X |
| 3,181,287 | 5/1965 | Robson | 55/443 X |
| 3,254,475 | 6/1966 | Farr et al. | 55/443 X |
| 4,159,196 | 6/1979 | Schneider et al. | 55/444 X |
| 4,545,792 | 10/1985 | Huttlin | 55/443 X |

Primary Examiner—Charles Hart
Attorney, Agent, or Firm—Herbert Dubno

[57] ABSTRACT

In an apparatus for collecting dust from a gas stream by centrifugal forces, essentially consisting of restraining and deflecting members which are arranged in alternation in the gas duct in a gridlike array, a D-section restraining-member configuration with a planar partition plate on its downstream arcuate side is used which permits as much as 40% of the dust content to be removed in a partial gas stream amounting to 3 to 6% of the entire gas stream and to accomplish this without an occurrence of unjustifiably high pressure drops.

12 Claims, 3 Drawing Sheets

Fig. 2
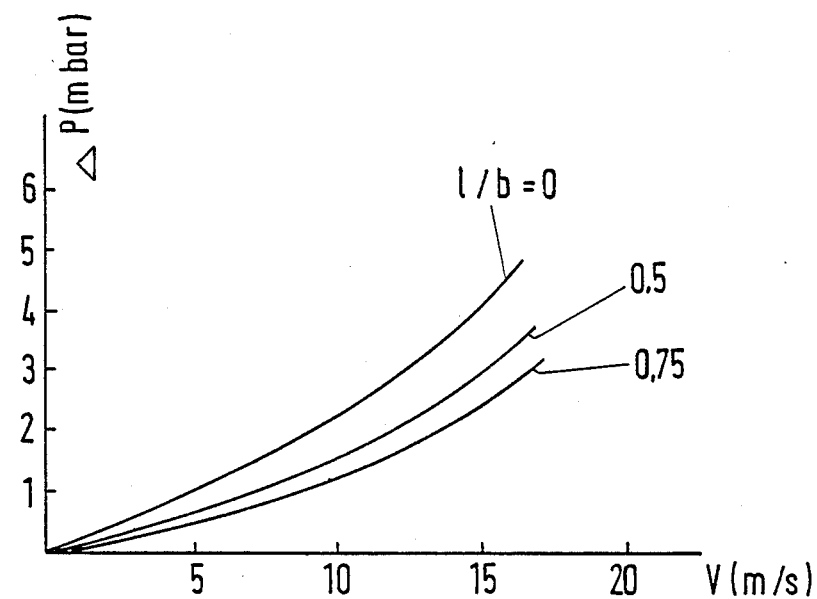
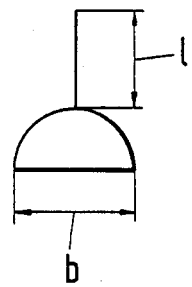
Fig. 3

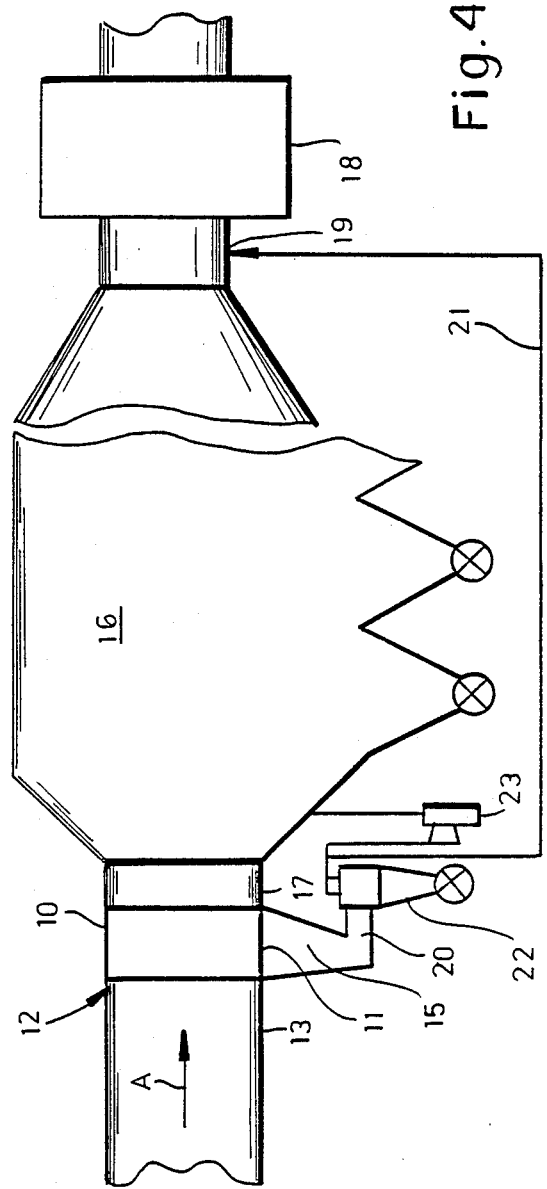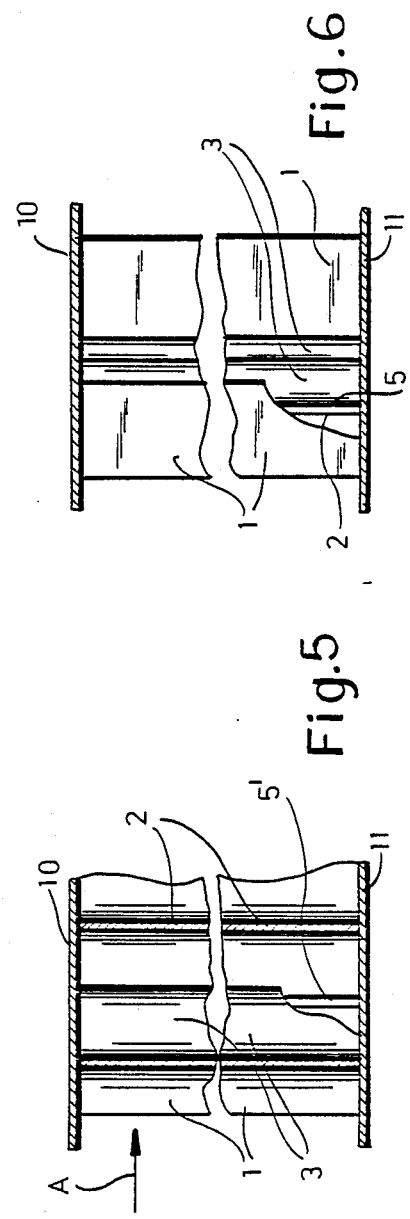

DUST-COLLECTING APPARATUS

FIELD OF THE INVENTION

My present invention relates to a dust-collecting apparatus and, more particularly, to a dust-collecting apparatus of the type in which the gas is caused to pass through an array of baffles which deflect the dust-entraining gas in an arcuate path so that dust separation is effective at least in part by a centrifugal action.

BACKGROUND OF THE INVENTION

An apparatus for collecting dust from a gas stream by centrifugal forces, as described in German utility model No. 17 03 648, essentially consists of restraining (barrier-forming) and deflecting members arranged in alternation in a gridlike array. Each of the deflecting members consists of two deflecting plates, which are symmetrically arranged with respect to the plane extending in the general direction of gas flow, and a stripping plate. The plates together enclose a cavity which communicates with the space that is traversed by the gas through gaps between the downstream edges of the deflecting members and the upstream edges of the stripping plate.

It has been found that this apparatus results in a relatively high pressure drop and can collect from the gas stream up to 20%, at best, of the quantity of dust that is to be removed. It also effects a classification because the coarser dust fraction preferentially enters the cavity.

OBJECTS OF THE INVENTION

It is an object of the invention to improve the separation performance of such an apparatus and particularly to reduce the resulting pressure drop so that a larger part of the total quantity of dust to be removed can be collected from the gas stream with a lower pressure drop so that, for example, a succeeding dust collector may have correspondingly smaller dimensions.

Another object of the invention is to provide an improved dust-collecting system in which the centrifugally acting dust collector is provided as an initial separator enabling an electrostatic precipitator to operate more effectively.

It is also an object of the invention to provide an improved method of operating a dust-collecting system.

SUMMARY OF THE INVENTION

These objects and others which will become apparent hereinafter are attained, in accordance with the invention in that the restraining members have a closed semicircular cross-section having a straight side, which is disposed upstream and extends at right angles to the gas stream, and a downstream arcuate side and are provided on that arcuate side with a planar partition plate, which is parallel to the gas flow.

The width of the restraining members measured at right angles to the gas flow is suitably about three times the width of the free gas flow area remaining between adjacent restraining members. The ratio of the length l of the partition plate, measured in the direction of flow, to the width b of the restraining member, measured at right angles to the direction of flow, may lie between 0.05 and 1.5. Particularly low drags have been achieved with a ratio l/b between 0.8 and 1.

The apparatus in accordance with the invention is preferably used in a dust-collecting process in which a partial gas stream is branched from the main gas stream through the gaps and cavities.

Advantageously, 3 to 6% of the main gas stream is branched off to flow through the cavities. The pressure drop required across the gaps to branch off the partial gas stream is maintained either by connecting the cavities to a downstream region at which the gas stream is at a lower pressure or by the provision of a separate fan or blower. The centrifugal separator of the invention is preferably used upstream of an electrostatic precipitator.

More specifically, the centrifugal separator of the invention comprises:

a housing having an inlet and an outlet for the gas stream;

a gridlike array of restraining and deflecting members arranged in alternation in the housing, wherein each of the deflecting members consists of two deflecting plates, which are symmetrically arranged with respect to a plane extending in a general direction of gas flow, and a stripping plate, the plates together enclosing a respective cavity which communicates with the space that is traversed by the gas stream through gaps between downstream edges of the deflecting plates and the upstream edges of the stripping plates, the restraining members having a closed semicircular cross section having a straight side, which is disposed upstream and extends at right angles to the gas stream, and a downstream arcuate side and being provided on the arcuate side with a planar partition plate, which is parallel to the gas flow; and means for generating a reduced pressure in the cavities.

BRIEF DESCRIPTION OF THE DRAWING

The above objects, features and advantages of my invention will become more readily apparent from the following description, reference being made to the accompanying drawing in which:

FIG. 2 is a set of graphs which illustrate the pressure drop effected by the apparatus in dependence on the velocity of flow and on the length of the partition plate;

FIG. 3 is a diagram illustrating the dimensional considerations with respect to the barrier-forming members of the grid;

FIG. 4 is a diagrammatic elevation of the dust-collecting system;

FIG. 5 is a sectional view taken along line V—V of FIG. 1, partly broken away; and FIG. 6 is a sectional view taken along line VI—VI of FIG. 1, partly broken away.

SPECIFIC DESCRIPTION

Figure 1:
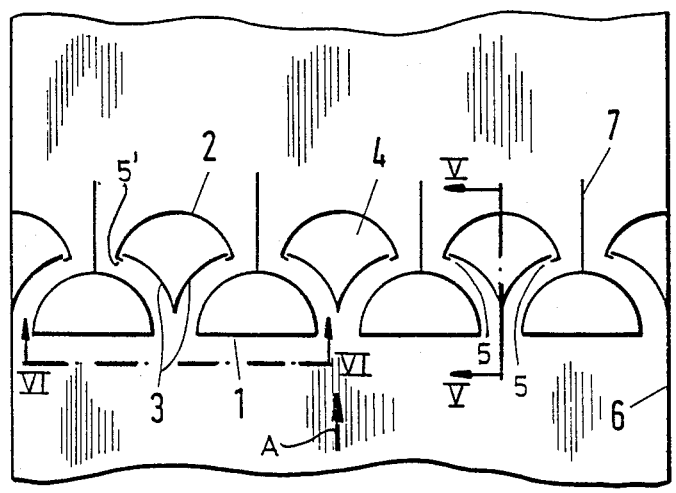
FIG. 1 is a transverse sectional view in diagrammatic form and without wall thickness because of the scale showing an embodiment of the gridlike apparatus.

FIG. 1 shows a portion of a gas duct, which is defined by the wall 6 and which contains restraining members 1, which are semicircular in cross section, and deflecting members, which are offset from the restraining members and enclose each a cavity 4. Each cavity 4 is defined by two deflecting plates 3, which are symmetrically arranged with respect to a plane extending in the general direction of gas flow, and a stripping plate 2.

Gaps 5 are defined between the downstream edges of the deflecting plates 3 and the upstream edges of the stripping plate 2. Through those gaps 5, the cavity 4 communicates with the space that is traversed by the gas.

In accordance with the invention each restraining member 1 is provided at its downstream arcuate side with a planar partition plate 7, which is parallel to the direction of gas flow and can exert a favorable influence on the resistance to flow in the apparatus.

In operation, the gas flows through the free spaces between the restraining members 1 and is deflected by the deflecting plates 3. That deflection results in transverse accelerations, which act more strongly on the dust particles than on the gas so that dust is enriched in the outer region of the partial stream.

If gas at a defined rate is branched from the gas stream through the gaps 5, that branched-off gas will contain dust in a much higher concentration than the gas stream that has not yet entered the apparatus.

In this manner, as much as 40% of the dust that is originally contained in the gas stream may be included in a partial gas stream of an order of 3 to 6% of the main gas stream and a succeeding dust collector for receiving the gas stream may have much smaller dimensions.

The partial gas stream having the higher dust content must be subjected to a separate dust collection to have the final dust content or to have the same dust content as the main gas stream which has flown through the apparatus in accordance with the invention. The expenditure involved in such separate dust collection will be much lower than the expenditure which will be required if an apparatus in accordance with the invention is not used for a preliminary collection of dust.

FIG. 2 shows how the pressure drop $\Delta p$ caused by the apparatus varies in dependence on the gas velocity V and the Ratio of the length l of the partition plate to the width b of the restraining member.

In extensive experiments it has been found that throughout the velocity range which has been investigated the pressure drop decreases from an initial value of $l/b=0$, i.e., with restraining members 1 having no partition plate 7, to $l/b$ values of about 0.5, will decrease continuously as far as to $l/b$ values of about 0.75 but will increase again with still higher values of $l/b$. It will be understood that the optimum values of $l/b$ will depend also on the parameters, such as the temperature and composition of the gas, its dust content, etc.. By an adjustment from an initial value of 0.75, it is rather easy to determine an optimum value of $l/b$ in a given application.

From FIGS. 4–6, it will be apparent that the D-shaped restraining or barrier-forming members 1 and the collecting cavities 4 extend between two plates 10, 11 forming the upper and lower walls of the dust collector or baffle-type separator 12.

The latter has a gas inlet 13 and an outlet 17, as well as a plenum 15 communicating with the cavities 4 through respective openings in the plate 11.

The baffle separate 12 is connected immediately upstream of an electrostatic precipitator 16 by the duct 17. The system is provided with a main blower or fan 18 which draws the gas through the baffle separator 12 and the electrostatic precipitator 16 provided downstream of the baffle separator 12. The plenum 15 is connected to a reduced pressure location by ducts 20, and 22. If desired, the dust entrained in the partial flow can be removed in a cyclone 22. Also, a separate blower 23 can be provided to generate the partial flow.

In FIG. 5 the bent edge 5' which defined the slit 5 with the carved plate 3 has been shown in elevation.

I claim:

1. An apparatus for collecting dust from a gas stream by centrifugal forces, comprising:
   a housing having an inlet and an outlet for said gas stream;
   a gridlike array of restraining and deflecting members arranged in alternation in said housing wherein each of said deflecting members consisting of two deflecting plates, which are symmetrically arranged with respect to a plane extending in a general direction of gas flow, and a stripping plate, said plates together enclosing a respective cavity which communicates with a space that is traversed by the gas stream through gaps between downstream edges of the deflecting plates and upstream edges of the stripping plates, said restraining members having a closed semicircular cross-section having a straight side, which is disposed upstream and extends at right angles to the gas stream, and a downstream arcuate side and being provided on said arcuate side with a planar partition plate, which is parallel to the gas flow; and
   means for generating a reduced pressure in said cavities.

2. The apparatus defined in claim 1 wherein a width of the restraining members measured at right angles to the gas flow is about three times a width of the total free gas flow area remaining between adjacent restraining members.

3. The apparatus defined in claim 1 wherein a ratio of the length l of the partition plate, measured in the direction of flow, to a width b of the restraining member, measured at right angles to the direction of flow, is between 0.5 and 1.35.

4. The apparatus defined in claim 3 wherein the ratio l/b is between 0.8 and 1.

5. The apparatus defined in claim 1 wherein a partial gas stream is branched from the main gas stream through the gaps and cavities.

6. The apparatus defined in claim 5 wherein 3 to 6% of the main gas stream are branched off.

7. The apparatus defined in claim 5 wherein a pressure drop required across the gaps to branch off the partial gas stream is maintained by the provision of a direct communication between the cavities of the deflecting members and a downstream region in which the gas stream is under a correspondingly lower pressure.

8. The apparatus defined in claim 5 wherein a pressure drop required at the gaps to branch off the partial gas stream is maintained by a separate fan.

9. The apparatus defined in claim 1 which constitutes a preliminary separator preceding a dust-collecting electrostatic precipitator.

10. A dust-collecting apparatus comprising:
    a baffle separator comprising:
    a housing having an inlet and an outlet for said gas stream;
    a gridlike array of restraining and deflecting members arranged in alternation in said housing wherein each of said deflecting members consisting of two deflecting plates, which are symmetrically arranged with respect to a plane extending in a general direction of gas flow, and a stripping plate, said plates together enclosing a respective cavity which communicates with a space that is traversed by the gas stream through gaps between downstream edges of the deflecting plates and upstream edges of the stripping plates, said restraining members having a closed semicircular cross-section having a straight side, which is disposed upstream and extends at right angles to the gas stream, and a downstream arcuate side and being provided on said arcuate side with a planar partition plate, which is parallel to the gas flow; and means for generating a reduced pressure in said cavities; and an electrostatic precipitator downstream of said baffle separator.

11. The apparatus defined in claim 10 wherein said means for generating a reduced pressure in said cavities is a connection between said cavities and a location of said apparatus downstream of said apparatus.

12. In a method of operating a dust-collecting apparatus which comprises:

a housing having an inlet and an outlet for said gas stream;

a gridlike array of restraining and deflecting members arranged in alternation in said housing wherein each of said deflecting members consisting of two deflecting plates, which are symmetrically arranged with respect to a plane extending in a general direction of gas flow, and a stripping plate, said plates together enclosing a respective cavity which communicates with a space that is traversed by the gas stream through gaps between downstream edges of the deflecting plates and upstream edges of the stripping plates, said restraining members having a closed semicircular cross-section having a straight side, which is disposed upstream and extends at right angles to the gas stream, and a downstream arcuate side and being provided on said arcuate side with a planar partition plate, which is parallel to the gas flow; and means for generating a reduced pressure in said cavities, the improvement which comprises branching-off 3 to 6% of the gas stream through said cavities.

* * * * *